US012298185B2

(12) United States Patent
Park et al.

(10) Patent No.: US 12,298,185 B2
(45) Date of Patent: May 13, 2025

(54) MULTI-VIEW LUMINANCE MEASURING DEVICE AND METHOD FOR MEASURING MULTI-VIEW LUMINANCE

(71) Applicant: SAMSUNG DISPLAY CO., LTD., Yongin-si (KR)

(72) Inventors: Young Min Park, Yongin-si (KR); O Jun Kwon, Yongin-si (KR); Jae Joong Kwon, Yongin-si (KR); Jin Seo, Yongin-si (KR); A Ree Song, Yongin-si (KR); Eun Jung Lee, Yongin-si (KR); Ha Young Lee, Yongin-si (KR); Young Sang Ha, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/416,972

(22) Filed: Jan. 19, 2024

(65) Prior Publication Data
US 2024/0272002 A1 Aug. 15, 2024

(30) Foreign Application Priority Data
Feb. 14, 2023 (KR) ........................ 10-2023-0019683

(51) Int. Cl.
*G01J 3/50* (2006.01)
*H04N 13/305* (2018.01)
*H04N 13/351* (2018.01)

(52) U.S. Cl.
CPC ............ *G01J 3/505* (2013.01); *H04N 13/305* (2018.05); *H04N 13/351* (2018.05)

(58) Field of Classification Search
CPC ...... G01J 3/505; H04N 13/305; H04N 13/351
See application file for complete search history.

(56) References Cited

U.S. PATENT DOCUMENTS

| 8,654,183 B2 | 2/2014 | Jung et al. | |
|---|---|---|---|
| 8,704,880 B2 | 4/2014 | Lim et al. | |
| 2012/0107978 A1* | 5/2012 | Shin | H10K 50/844 |
| | | | 257/E33.067 |
| 2013/0162691 A1* | 6/2013 | Yang | G02B 30/27 |
| | | | 345/690 |

FOREIGN PATENT DOCUMENTS

| CN | 2175416 | 8/1994 | |
|---|---|---|---|
| CN | 203299441 U * | 11/2013 | ......... G02B 27/2214 |
| KR | 10-1282957 | 7/2013 | |
| KR | 10-1289656 | 7/2013 | |
| WO | WO-2005078520 A1 * | 8/2005 | ......... G02B 27/2214 |
| WO | WO-2007019347 A2 * | 2/2007 | ......... G02B 27/2214 |

\* cited by examiner

*Primary Examiner* — Georgia Y Epps
*Assistant Examiner* — Don J Williams
(74) *Attorney, Agent, or Firm* — F. CHAU & ASSOCIATES, LLC

(57) ABSTRACT

A multi-view luminance measuring device includes: a base substrate having a long side extending in a first direction and a short side extending in a second direction, wherein the long side is curved with a first curvature; a plurality of lenses positioned on an inner surface of the base substrate; and a plurality of optical sensors positioned on the base substrate to respectively correspond to the plurality of lenses, wherein the first curvature is set such that a distance between each of the plurality of lenses and a target point is constant, and wherein a length of the long side of the base substrate is set to cover a viewing angle with reference to the target point.

20 Claims, 16 Drawing Sheets

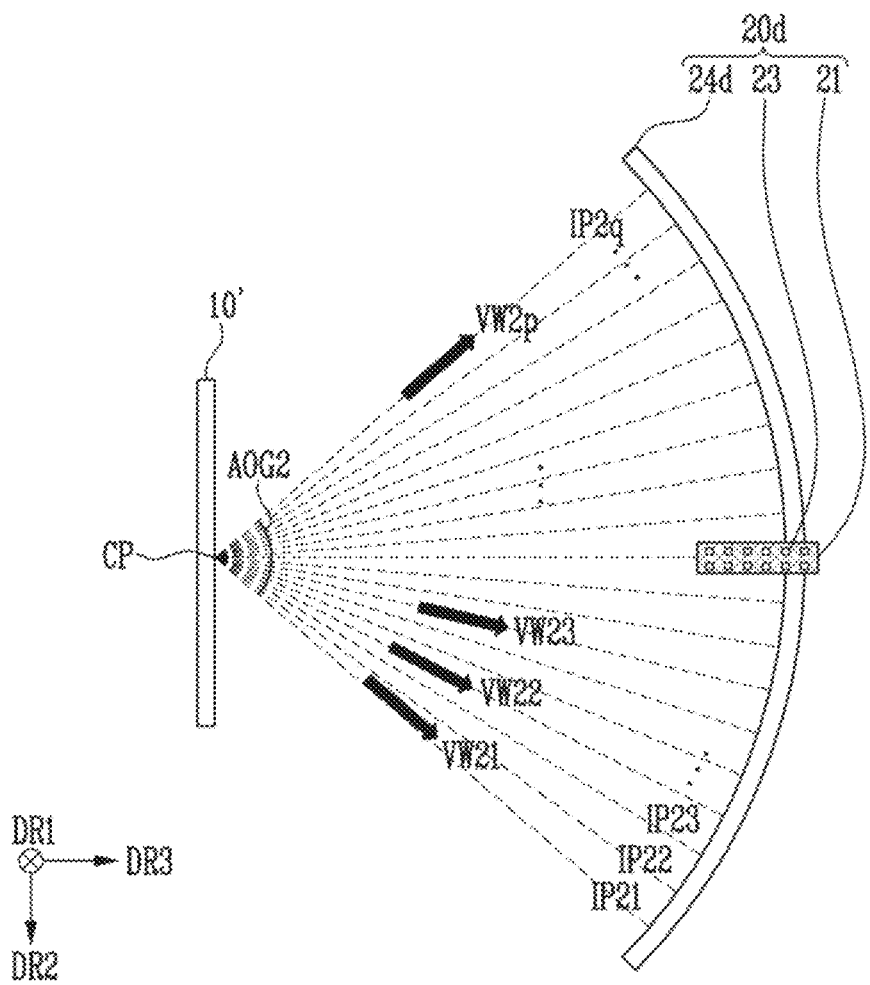

MULTI-VIEW LUMINANCE MEASURING DEVICE AND METHOD FOR MEASURING MULTI-VIEW LUMINANCE

CROSS-REFERENCE TO RELATED APPLICATION

The application claims priority under 35 U.S.C. § 119(a) to Korean Patent Application No. 10-2023-0019683, filed on Feb. 14, 2023, the disclosure of which is incorporated by reference herein in its entirety.

TECHNICAL FIELD

The present invention relates to a multi-view luminance measuring device and a method for measuring multi-view luminance.

DISCUSSION OF THE RELATED ART

With the development of information technology, the importance of display devices, which are a connection medium between users and information, has been increasing. In response to this, the use of display devices such as a liquid crystal display device, an organic light emitting display device, and the like has been increasing.

A stereoscopic image display device is a display device that provides physical factors so that a viewer perceives an image as a stereoscopic image by stimulating a viewer's visual sense like a real three dimensional object. For example, the stereoscopic image display device provides different images to viewer's left and right eyes so that the viewer can view a stereoscopic image by binocular parallax between left and right eyes.

Recently, studies on an autostereoscopic method in which stereoscopic glasses are not worn have been actively conducted. Generally, the autostereoscopic method may include a lenticular method for separating left and right eye images using a cylindrical lens array, a barrier method for separating left and right eye images using a barrier, and the like.

An autostereoscopic display device may form a light field composed of a plurality of viewpoints. In this case, crosstalk, in which each viewpoint partially overlaps with adjacent viewpoints, may occur. To check the degree of crosstalk, it is desirable to measure a luminance for each viewpoint. However, measuring the luminance as the number of viewpoints increases may consume a lot of time.

SUMMARY

According to an embodiment of the present invention, a multi-view luminance measuring device includes: a base substrate having a long side extending in a first direction and a short side extending in a second direction, wherein the long side is curved with a first curvature; a plurality of lenses positioned on an inner surface of the base substrate; and a plurality of optical sensors positioned on the base substrate to respectively correspond to the plurality of lenses, wherein the first curvature is set such that a distance between each of the plurality of lenses and a target point is constant, and wherein a length of the long side of the base substrate is set to cover a viewing angle with reference to the target point.

In an embodiment of the present invention, the plurality of lenses are convex lenses, and wherein the plurality of lenses are integrally connected to each other.

In an embodiment of the present invention, the plurality of optical sensors are mounted on a flexible circuit board, wherein the flexible circuit board is in contact with an outer surface of the base substrate, and wherein the plurality of optical sensors are disposed in a plurality of openings of the base substrate.

In an embodiment of the present invention, the flexible circuit board is configured to be attachable to and detachable from the base substrate.

In an embodiment of the present invention, the base substrate is flexible to allow changing the first curvature.

In an embodiment of the present invention, a number of luminance measurement points are predetermined to generate a luminance profile, and wherein a number of the plurality of lenses is equal to the number of the luminance measurement points.

In an embodiment of the present invention, a number of the plurality of lenses is equal to a number of the plurality of optical sensors.

According to an embodiment of the present invention, a multi-view luminance measuring device includes: a base substrate having a first side extending in a first direction and a second side extending in a second direction, wherein the first side is curved with a first curvature; a plurality of lenses positioned on a first surface of the base substrate; a plurality of optical sensors positioned on the base substrate to respectively correspond to the plurality of lenses; and a rail on which the base substrate slides, wherein the first curvature is set such that a distance between each of the plurality of lenses and a target point is constant.

In an embodiment of the present invention, a first side of the rail extends in the first direction and is curved with the first curvature.

In an embodiment of the present invention, a number of the plurality of lenses is equal to a number of the plurality of optical sensors.

In an embodiment of the present invention, a length of the first side of the base substrate is set to cover a part of a viewing angle with reference to the target point.

In an embodiment of the present invention, a number of luminance measurement points are set in advance to generate a luminance profile, wherein a number of the plurality of lenses is smaller than the number of the luminance measurement points, and wherein an interval between the plurality of lenses is a same as an interval between the luminance measurement points.

In an embodiment of the present invention, a number of luminance measurement points are set in advance to generate a luminance profile, wherein a number of the plurality of lenses is smaller than the number of the luminance measurement points, and wherein an interval between the plurality of lenses is greater than an interval between the luminance measurement points.

In an embodiment of the present invention, the plurality of lenses are convex lenses, and wherein the plurality of lenses are integrally connected to each other.

In an embodiment of the present invention, the plurality of optical sensors are mounted on a flexible circuit board, wherein the flexible circuit board is disposed on a second surface of the base substrate, and wherein the plurality of optical sensors are disposed in a plurality of openings of the base substrate.

In an embodiment of the present invention, the flexible circuit board is configured to be attachable to and detachable from the base substrate.

In an embodiment of the present invention, each of the base substrate and the rail is flexible to allow changing the first curvature.

According to an embodiment of the present invention, a method for measuring multi-view luminance using a multi-view luminance measuring device, wherein the multi-view luminance measuring device includes: a base substrate having a curved side; a plurality of lenses positioned on a first surface of the base substrate; a plurality of optical sensors positioned on the base substrate and respectively corresponding to the plurality of lenses; and a rail on which the base substrate slides, and wherein the method for measuring multi-view luminance includes: measuring first luminances of a target point by using the plurality of optical sensors when the plurality of lenses are positioned at first luminance measurement points; measuring second luminances of the target point by using the plurality of optical sensors in a state in which the plurality of lenses are positioned at second luminance measurement points that are different from the first luminance measurement points as the base substrate moves along the rail; and generating a luminance profile for the target point by using the first luminances and the second luminances.

In an embodiment of the present invention, an interval between the plurality of lenses is a same as an interval between the first luminance measurement points.

In an embodiment of the present invention, an interval between the plurality of lenses is greater than an interval between the first luminance measurement points.

BRIEF DESCRIPTION OF THE DRAWINGS

The above and other features of the present invention will become more apparent by describing in further detail exemplary embodiments thereof with reference to the accompanying drawings, in which:

FIGS. 15 and 16 are diagrams illustrating a multi-view luminance measuring device according to an embodiment of the present invention with respect to the display device of FIG. 12.

DETAILED DESCRIPTION OF THE EMBODIMENTS

Figure 1:
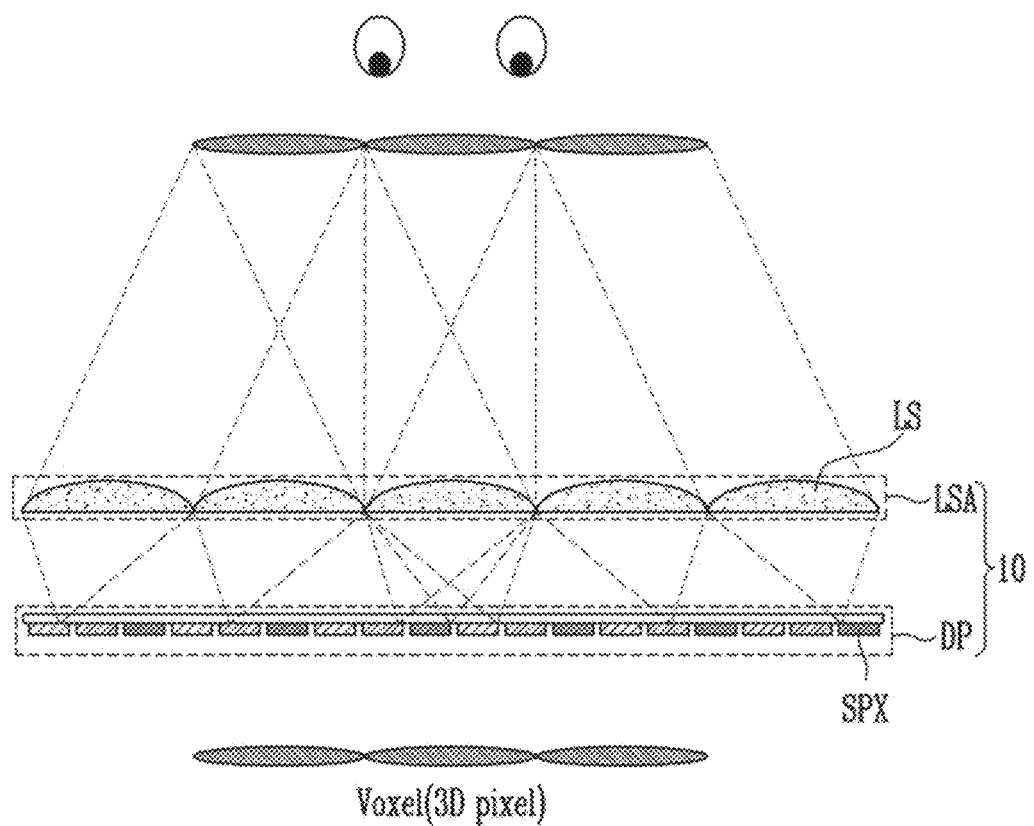
FIG. 1 is a diagram illustrating a stereoscopic image display device of a lens array type according to an embodiment of the present invention.

Hereinafter, various embodiments of the present invention will be described in detail with reference to the accompanying drawings. The present invention may be embodied in various different forms and is not limited to the embodiments described herein.

The same or similar components are denoted by the same reference numerals throughout the specification and drawings, and a repeated description of the same components may be omitted or briefly discussed. Therefore, the reference numerals described above may also be used in other drawings.

In the drawings, various thicknesses, lengths, and angles are shown and while the arrangement shown does indeed represent an embodiment of the present invention, it is to be understood that modifications of the various thicknesses, lengths, and angles may be possible within the spirit and scope of the present invention and the present invention is not necessarily limited to the particular thicknesses, lengths, and angles shown.

It is also noted that, as used herein, the terms "substantially," "about," and other similar terms, are used as terms of approximation, not as terms of degree, and thus are utilized to account for inherent deviations in measured, calculated, and/or provided values that would be recognized by one of ordinary skill in the art.

FIG. 1 is a diagram illustrating a stereoscopic image display device of a lens array type according to an embodiment of the present invention.

Referring to FIG. 1, a display device 10 may include a display panel DP and a lens array LSA.

The display panel DP may include sub-pixels SPX that emit light to display an image. In an embodiment of the present invention, each of the sub-pixels SPX may output light of one of a first color (for example, red), a second color (for example, green), or a third color (for example, blue). However, this is only an example, and the color of light emitted from the sub-pixels SPX is not limited thereto. The sub-pixels SPX may output light of various colors to implement a full-color image. For example, the display panel DP may include an organic light emitting display panel, a liquid crystal display panel, a quantum dot display panel, or the like.

The lens array LSA may include lenses LS that are disposed on the display panel DP and that refract light incident from the sub-pixels SPX. For example, the lens array LSA may be implemented as a lenticular lens array, a micro lens array, or the like.

A light field display may be a 3D display device that implements a stereoscopic image by forming a light field expressed as a vector distribution (e.g., including an intensity and a direction) of light in space using a flat panel display and an optical element (for example, the lens array LSA). The light field display may realize a more natural stereoscopic image by being able to see the depth and side of an object, and may be a display technology that is expected to be used in various ways through convergence with AR (augmented reality) technology.

The light field may be implemented in a variety of ways. For example, the light field may be formed by a method of forming multi-directional light fields using multiple projectors, a method of controlling the direction of light using a diffraction grating, a method of adjusting the direction and intensity (e.g., luminance) of light according to the combination of each pixel using two or more panels, a method for controlling the direction of light using a pinhole or barrier, a method for controlling the refraction direction of light through a lens array, or the like.

In an embodiment of the present invention, as shown in FIG. 1, the stereoscopic image display device 10 of a lens array type may display a stereoscopic image (3D image) by forming the light field.

A series of sub-pixels SPX may be assigned to each lens LS, and light emitted from each of the sub-pixels SPX may be refracted by the corresponding lens LS and directed in a specific direction to form a light field represented by light intensity and direction. When a viewer looks at the display device 10 within the light field formed as described above, the viewer can realize a three-dimensional effect of a corresponding image.

Image information according to the viewpoint of the viewer in the light field may be defined and processed in units of voxels. A voxel may be understood as graphic information defining a predetermined point (or pixel) in a 3D space.

In addition, the resolution of a 2D image can be determined by the number of pixels (for example, density) for the same area. For example, as the number of pixels for the same area increases, the resolution may increase. For example, the display panel DP having a high pixel density may be required for a high-resolution image. Similarly, when the number of voxels at the same viewpoint through the lens array LSA increases, the resolution of the stereoscopic image may increase.

Figure 2:
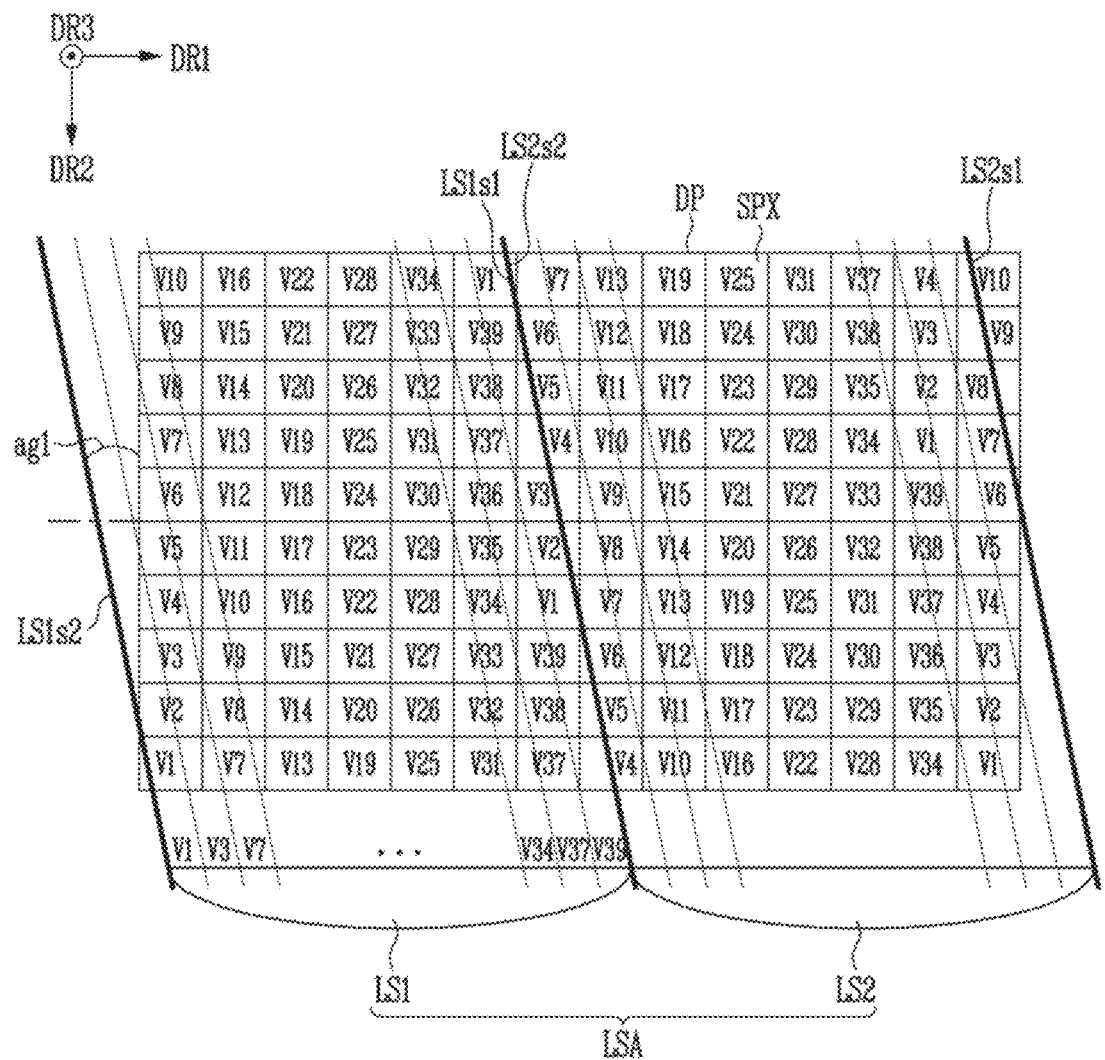
FIG. 2 is a diagram illustrating the relationship between a lens array and a display panel according to an embodiment of the present invention.

FIG. 2 is a diagram illustrating the relationship between a lens array and a display panel according to an embodiment of the present invention.

The display panel DP may include the sub-pixels SPX arranged in a first direction DR1 and a second direction DR2 that is substantially perpendicular to the first direction DR1. The sub-pixels SPX may include light emitting surfaces that emits light in a third direction DR3 that is perpendicular to the first and second directions DR1 and DR2.

The lens array LSA may include lenses LS1, LS2, . . . . The lenses LS1, LS2, . . . may overlap the sub-pixels SPX in the third direction DR3. The lenses LS1, LS2, . . . may be arranged such that their long sides have an angle ag1 greater than 0 degrees with respect to the second direction DR2. For example, the lenses LS1, LS2, . . . may be lenticular lenses. For example, a first lens LS1 may include a first long side LS1$s$1 and a second long side LS1$s$2 that are parallel to each other. In addition, a second lens LS2 may include a first long side LS2$s$1 and a second long side LS2$s$2 that are parallel to each other. The lenses LS1, LS2, . . . may be arranged in the first direction DR1. However, in an embodiment of the present invention, the angle ag1 may be 0.

A lower surface (e.g., a surface facing the sub-pixels) of each of the lenses LS1, LS2, . . . may be partitioned into a plurality of viewpoint areas V1 to V39. The plurality of viewpoint areas V1 to V39 might not be physically partitioned, and as virtual areas, may be defined in various ways according to the resolution of the display panel DP, the specifications of the lenses LS1, LS2, . . . , the number of viewpoints to be provided to a user, and like. Each of the lenses LS1, LS2, . . . may distribute images corresponding to each of the viewpoint areas V1 to V39 in different directions (e.g., different viewpoints), and the user may visually recognize a multi-view image in which an image varies depending on a location.

The sub-pixels SPX may overlap one or more of the plurality of viewpoint areas V1 to V39. FIG. 2 shows main viewpoint areas V1 to V39 corresponding to the sub-pixels SPX, respectively. The sub-pixels SPX corresponding to the same viewpoint area may display an image for the same viewpoint. For example, in FIG. 2, since there are 39 viewpoint areas V1 to V39, the display panel DP may display 39 images at the same time.

In addition, sub-pixels SPX overlapping the viewpoint areas V1 to V20 display a right eye image and sub-pixels SPX overlapping the viewpoint areas V21 to V39 display a left eye image, so that the display device 10 may display a stereoscopic image. In this case, the user should be positioned so that the left eye image is visually recognized by the left eye and the right eye image is visually recognized by the right eye.

The sub-pixels SPX may be arranged in various structures such as RGB stripe, diamond PENTILE™, S-stripe, real RGB, and normal PENTILE™.

Figure 3:
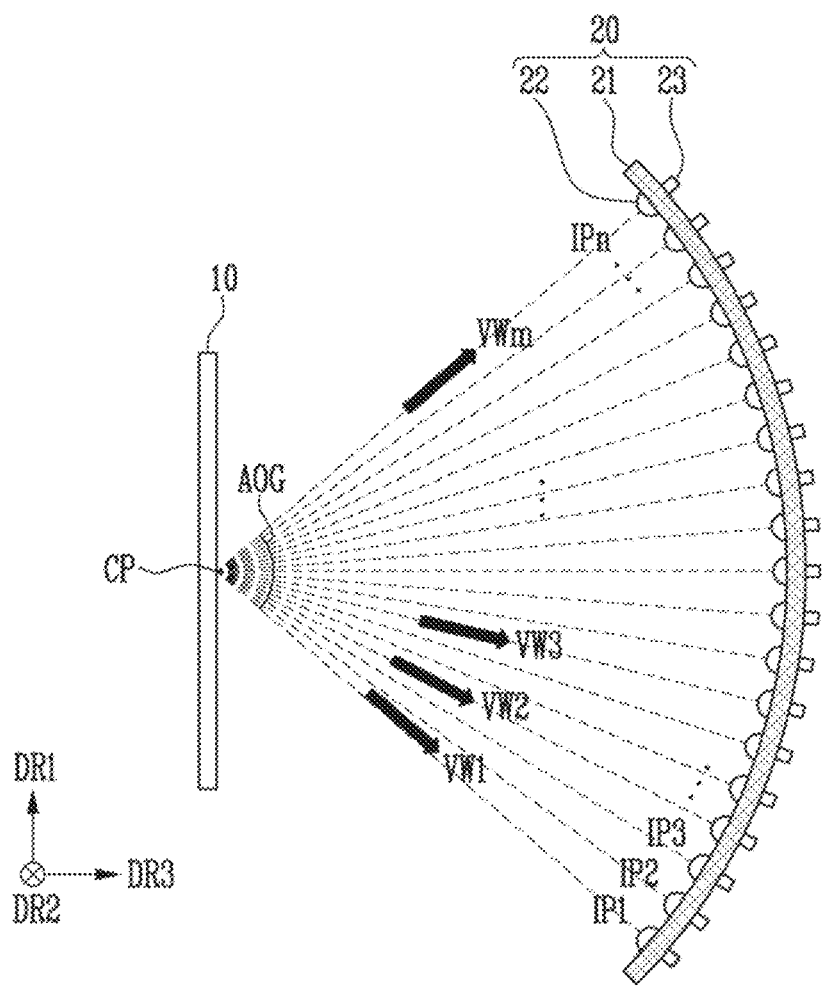
FIG. 3 is a diagram illustrating the relationship between a multi-view luminance measuring device and a display device according to an embodiment of the present invention.
Figure 4:
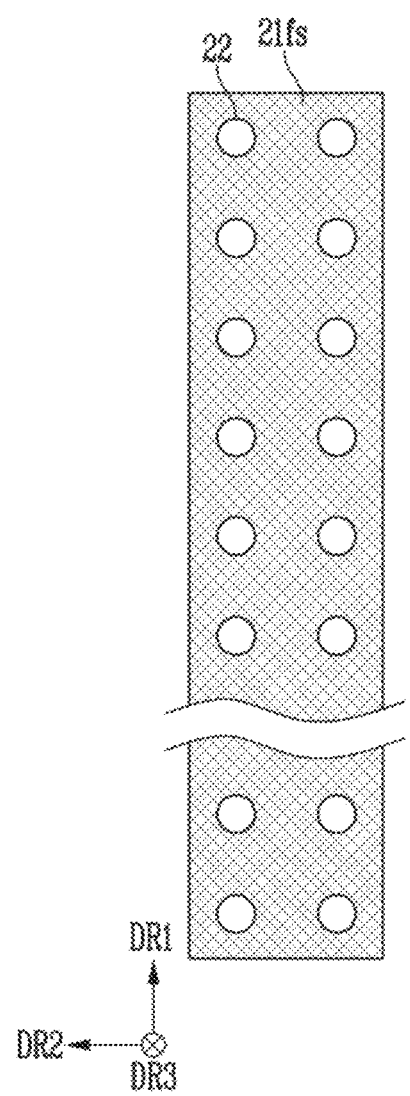
FIG. 4 is a diagram illustrating an inner surface of a base substrate in the multi-view luminance measuring device of FIG. 3.
Figure 5:
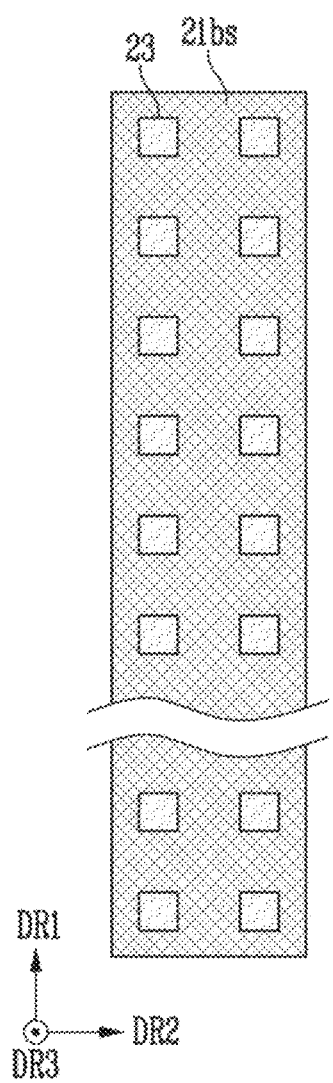
FIG. 5 is a diagram illustrating an outer surface of the base substrate in the multi-view luminance measuring device of FIG. 3.

FIG. 3 is a diagram illustrating the relationship between a multi-view luminance measuring device and a display device according to an embodiment of the present invention. FIG. 4 is a diagram illustrating an inner surface of a base substrate in the multi-view luminance measuring device of FIG. 3. FIG. 5 is a diagram illustrating an outer surface of the base substrate in the multi-view luminance measuring device of FIG. 3.

Referring to FIG. 3, a multi-view luminance measuring device 20 according to an embodiment of the present invention may include a base substrate 21, a plurality of lenses 22, and a plurality of optical sensors 23.

The base substrate 21 may have a long side extending in a first direction DR1 and a short side extending in a second direction DR2 that intersects the first direction DR1. In this case, the long side of the base substrate 21 may be curved with a first curvature.

The first curvature may be set such that a distance between the plurality of lenses 22 and a target point CP is substantially constant. This is to keep a focal distance between an optical sensor and the target point CP substantially constant when evaluating crosstalk of the display device 10.

A length of the long side of the base substrate 21 may be set to cover the entirety of a viewing angle AOG based on the target point CP. Accordingly, since the multi-view luminance measuring device 20 according to the present embodiment can generate a luminance profile for the target point CP with one measurement, measurement time can be shortened.

In the present embodiment, it is assumed that the target point CP is the central point of a display surface of the display device 10. According to an embodiment of the present invention, a plurality of target points CP may be set for a plurality of points on the display surface of the display device 10. When a plurality of target points CP are set, a method for measuring multi-view luminance may be performed for each of the plurality of target points CP. In the present embodiment, for convenience of description, a multi-view luminance measuring device 20 and a method for measuring multi-view luminance for one target point CP will be described.

In the present embodiment, the viewing angle AOG may be an angle between a first viewpoint VW1 and a last viewpoint VW1 among a plurality of viewpoints VW1, VW2, VW3, . . . , and VWm that are implemented in the display device 10 based on the target point CP, where m may be an integer greater than 1. The plurality of viewpoints VW1, VW2, VW3, . . . , and VWm may correspond to the plurality of viewpoint areas V1 to V39 described with reference to FIG. 2 on a one-to-one basis. For example, when the number of the plurality of viewpoint areas V1 to V39 is 39, m may be 39. A user of the display device 10 may view an image implemented by sub-pixels SPX corresponding to each of the viewpoint areas V1 to V39 at a position corresponding to each of the viewpoints VW1 to VWm.

The plurality of lenses 22 may be positioned on an inner surface 21fs of the base substrate 21. Here, the inner surface 21fs of the base substrate 21 may be a surface facing the display device 10. Each of the plurality of lenses 22 may condense light in a specific area to a corresponding optical sensor. The plurality of lenses 22 may be composed of conventional condensing lenses. For example, the plurality of lenses 22 may be implemented as convex lenses.

The plurality of optical sensors 23 may be positioned on the base substrate 21 to respectively correspond to the plurality of lenses 22. For example, the plurality of optical sensors 23 may be positioned on an outer surface 21bs of the base substrate 21 as shown in FIG. 5. The outer surface 21bs of the base substrate 21 may be a surface opposite to the inner surface 21fs of the base substrate 21. In this case, the base substrate 21 may include a plurality of openings formed between the plurality of lenses 22 and the plurality of optical sensors 23, and the plurality of openings may respectively correspond to the plurality of lenses 22 and the plurality of optical sensors 23 to secure an optical path. However, when the base substrate 21 is made of a transparent material, the base substrate 21 might not include the plurality of openings.

In an embodiment of the present invention, the number of the plurality of optical sensors 23 may be equal to the number of the plurality of lenses 22. In this case, one lens may perform a light condensing function for one optical sensor.

Each of the plurality of optical sensors 23 may include photodiodes. A photodiode does not flow current when a voltage is applied in a reverse direction, but when light is received, electrons are excited and current can flow even when a voltage is applied in the reverse direction. Depending on the amount of current, the amount of luminance may be measured. For example, the amount of luminance increases as the amount of current increases. In an embodiment of the present invention, the plurality of optical sensors 23 may include photo transistors.

To generate the luminance profile for the target point CP, a predetermined number of luminance measurement points IP1, IP2, IP3, ..., and IPn may be predetermined. The number of the plurality of luminance measurement points IP1, IP2, IP3, ..., and IPn may be equal to the number of the plurality of lenses 22. The user may acquire the luminance profile for the target point CP by measuring luminance after placing the multi-view luminance measuring device 20 so that the plurality of lenses 22 are positioned at the plurality of luminance measurement points IP1, IP2, IP3, ..., and IPn. In this case, the number of the plurality of luminance measurement points IP1, IP2, IP3, ..., and IPn may be greater than the number of the plurality of viewpoints VW1, VW2, VW3, ..., and VWm.

Figure 6:
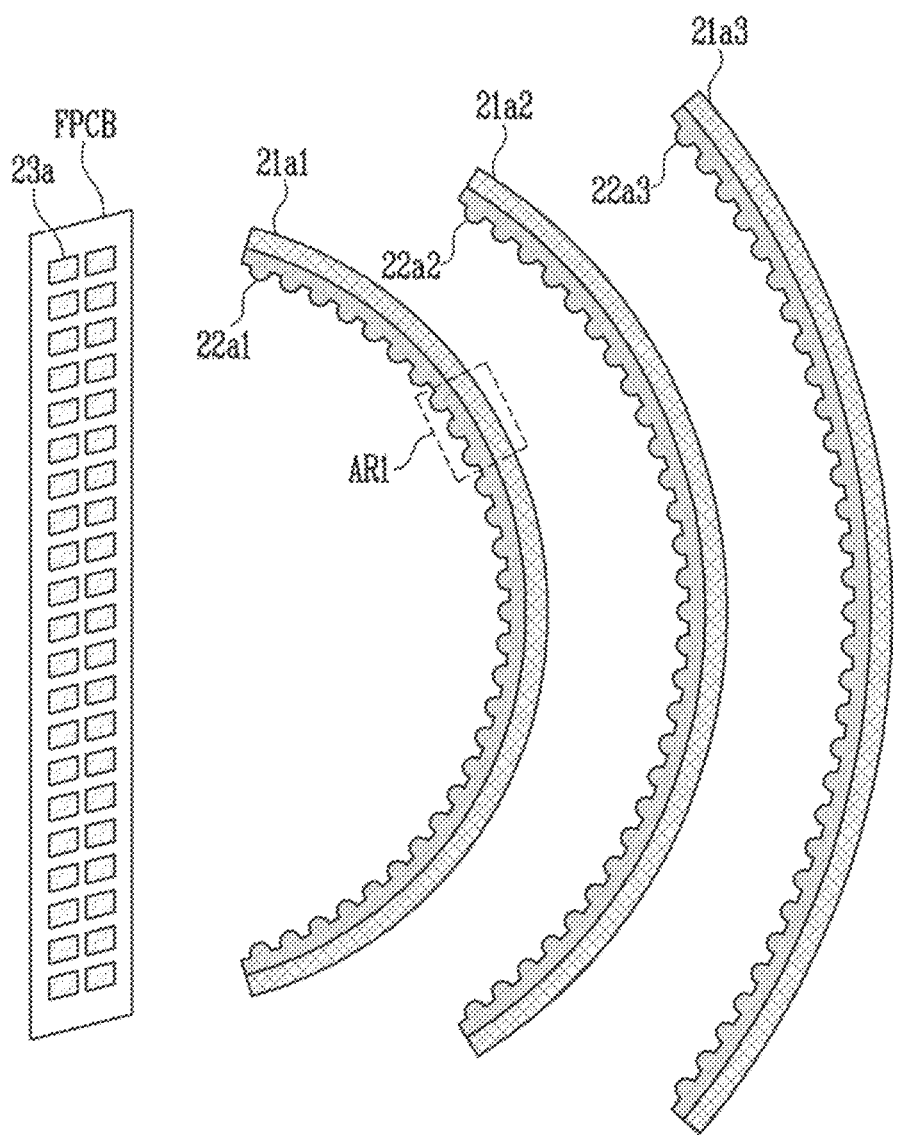
FIGS. 6, 7, 8, 9, 10 and 11 are diagrams illustrating multi-view luminance measuring devices according to an embodiment of the present invention.

FIGS. 6 to 11 are diagrams illustrating multi-view luminance measuring devices according to an embodiment of the present invention. Referring to FIG. 6, base substrates 21a1, 21a2, and 21a3 having different first curvatures from each other are shown as an example. Depending on the structure of the display device 10, various first curvatures may be provided to have a different focal length or to evaluate crosstalk according to viewing distances.

For example, a plurality of lenses 22a1, 22a2, and 22a3 may be integrally connected to each other. In this case, the plurality of lenses 22a1, 22a2, and 22a3 integrally connected to each other need to be curved according to a corresponding first curvature.

In addition, a plurality of optical sensors 23a may be mounted on a flexible circuit board FPCB, and the flexible circuit board FPCB may be configured to be selectively attached to and detached from the base substrates 21a1, 21a2, and 21a3. Accordingly, even if only one set of the plurality of optical sensors 23a and the flexible circuit board FPCB is provided, configuration cost can be reduced because they can be used to evaluate luminance of various display devices 10.

Figure 7:
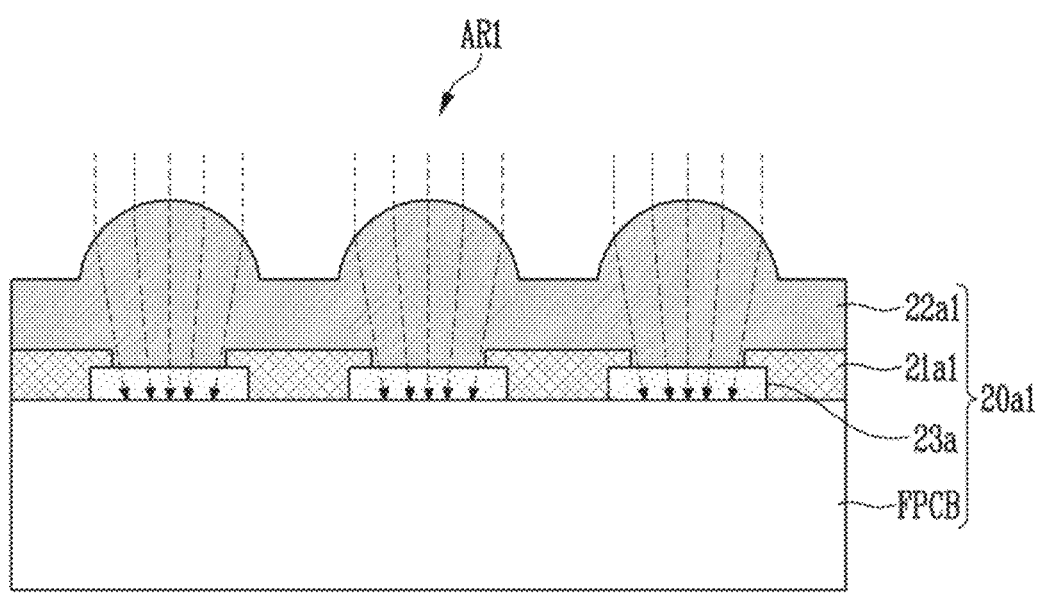

FIG. 7 is an enlarged cross-sectional view of a partial area AR1 of FIG. 6. FIG. 7 shows a multi-view luminance measuring device 20a1 in which a plurality of optical sensors 23a and a flexible circuit board FPCB are attached to a base substrate 21a1. For example, the flexible circuit board FPCB may be in contact with an outer surface of the base substrate 21a1, and the plurality of optical sensors 23a may be inserted into a plurality of openings of the base substrate 21a1. The plurality of openings may provide an optical path between a corresponding lens 22a1 and a corresponding optical sensor 23a.

In addition, according to an embodiment of the present invention, the base substrates 21a1, 21a2, or 21a3 may be configured to have flexibility so that the first curvature can be reset. In this case, even if only one base substrate 21a1, 21a2, or 21a3 is provided, configuration cost can be reduced because it can be used to evaluate luminance of various display devices 10. In this case, the plurality of lenses 22a1, 22a2, or 22a3 integrally connected to each other may also be configured to have flexibility. In an embodiment of the present invention, the plurality of lenses 22a1, 22a2, or 22a3 might not be integrally configured, but may be configured to be separated from each other.

The structures of FIGS. 6 and 7 may be applied to all of the embodiments of FIGS. 3 and 8 to 16. In the following, redundant descriptions may be omitted or briefly discussed.

Figure 8:
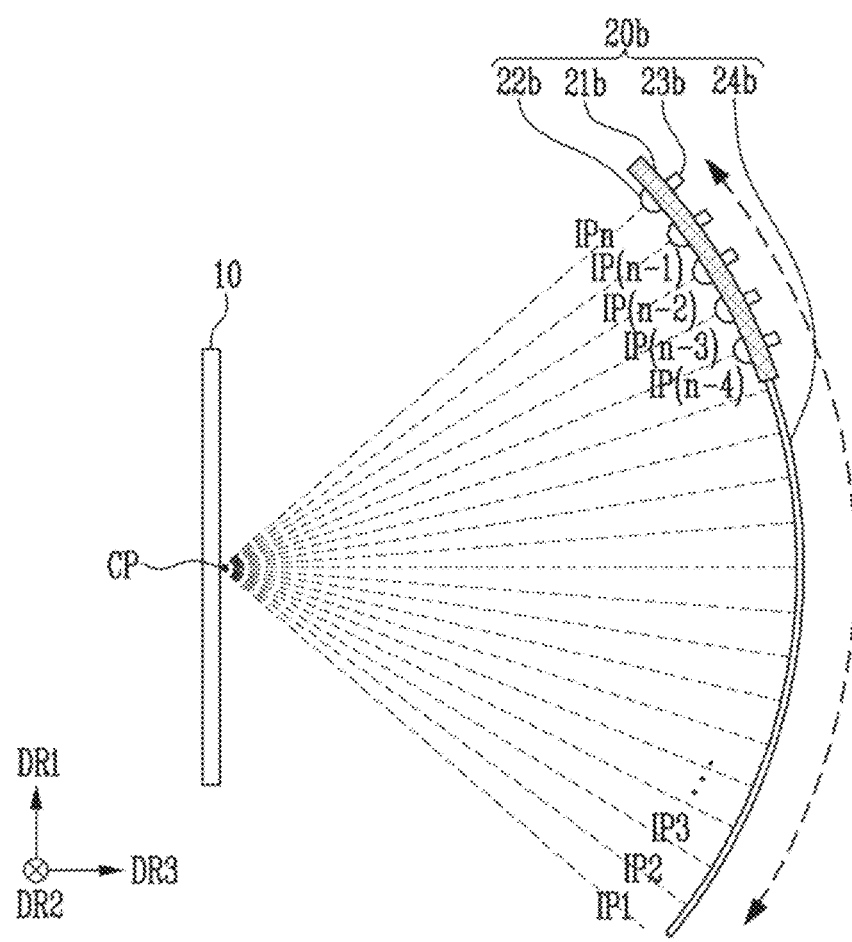

Referring to FIG. 8, a multi-view luminance measuring device 20b according to an embodiment of the present invention may include a base substrate 21b, a plurality of lenses 22b, a plurality of optical sensors 23b, and a first rail 24b. Descriptions of overlapping contents with those described in FIG. 3 may be omitted or briefly discussed.

In the embodiment of FIG. 8, a length of a long side of the base substrate 21b may be set to cover a part of a viewing angle based on the target point CP. In this case, the number of the plurality of lenses 22b may be smaller than the number of the plurality of luminance measurement points IP1 to IPn. For example, the number of the plurality of lenses 22b may be equal to the number of some luminance measurement points IP(n-4) to IPn rather than all. In this case, an interval between the plurality of lenses 22b may be substantially the same as an interval between the luminance measurement points IP(n-4) to IPn.

The first rail 24b may be configured such that the base substrate 21b slides. For example, a long side of the first rail 24b may extend in a first direction DR1 and be curved with a first curvature. For example, the first rail 24b may be inside a portion of the base substrate 21b such that the base substrate 21b can slide along the first rail 24b.

A method for measuring multi-view luminance may be performed using the multi-view luminance measuring device 20b as follows. First, when the plurality of lenses 22b are positioned at first luminance measurement points IPn, IP(n-1), IP(n-2), IP(n-3), and IP(n-4), first luminances of the target point CP may be measured by using the plurality of optical sensors 23b.

Next, as the base substrate 21b moves along the first rail 24b, the plurality of lenses 22b may be positioned at second luminance measurement points different from the first luminance measurement points IPn, IP(n-1), IP(n-2), IP(n-3) and IP(n-4)), and second luminances of the target point CP may be measured by using the plurality of optical sensors 23b. Thereafter, if there are remaining luminance measurement points, after the base substrate 21b moves along the first rail 24b, a step of additionally measuring luminance by using the plurality of optical sensors 23b may be repeated.

Next, a luminance profile for the target point CP may be generated using the first luminances and the second luminances. In this case, if there are additionally measured luminances, corresponding luminances may also be used to generate the luminance profile.

In addition, in an embodiment of the present invention, the base substrate 21b and the first rail 24b may have flexibility so that the first curvature can be reset or changed. Therefore, even if only one multi-view luminance measuring device is provided, configuration cost can be reduced because it can be used to evaluate luminance of various display devices 10.

Figure 9:
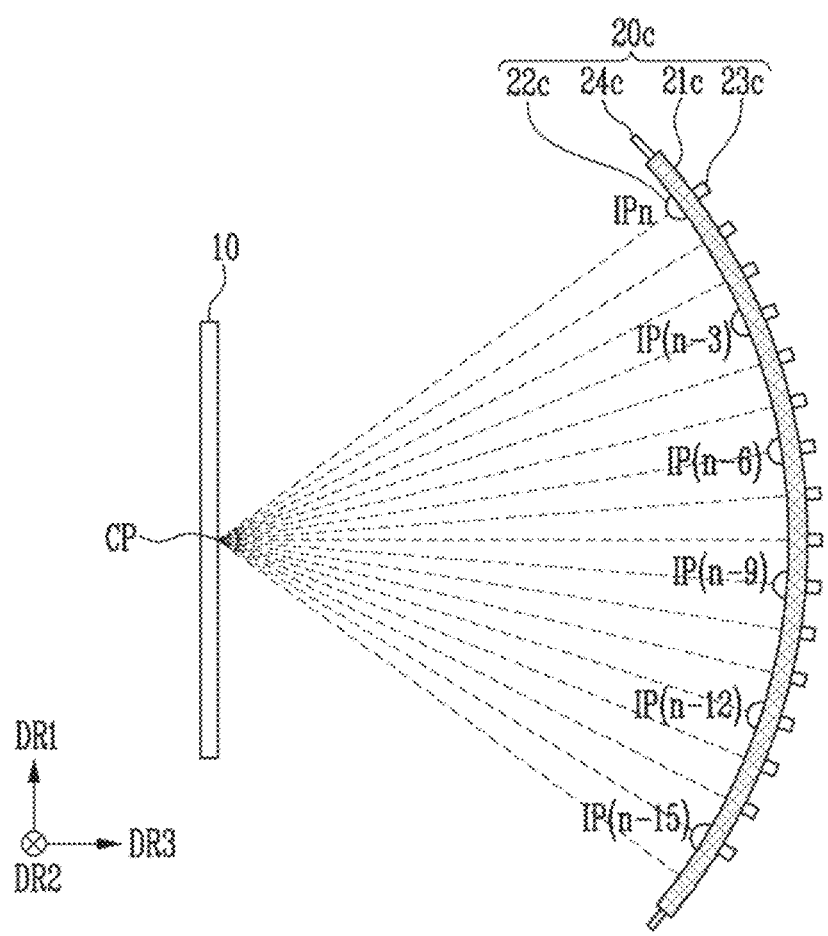
Figure 10:
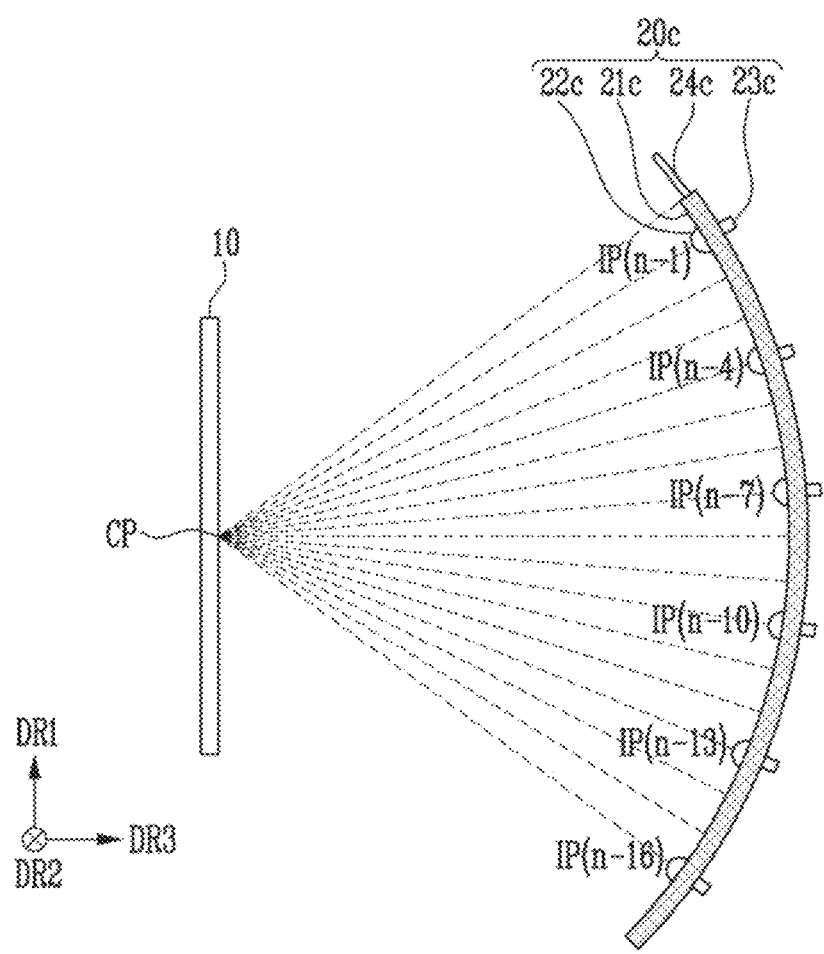
Figure 11:
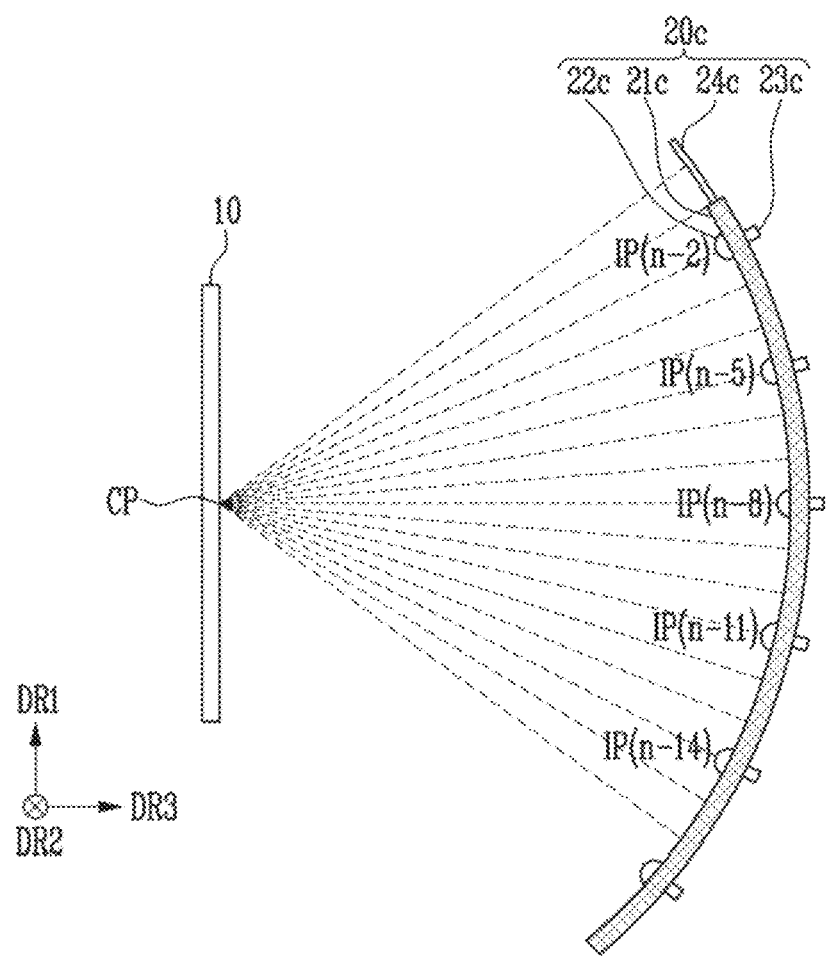

Referring to FIGS. 9 through 11, a multi-view luminance measuring device 20c according to an embodiment of the present invention may include a base substrate 21c, a plurality of lenses 22c, a plurality of optical sensors 23c, and a first rail 24c. Descriptions of overlapping contents with those described in FIG. 3 may be omitted or briefly discussed.

For example, a length of a long side of the base substrate 21c shown in FIG. 9 may be the same as or similar to the length of the long side of the base substrate 21 shown in FIG. 3. However, the number of the plurality of lenses 22c shown in FIG. 9 may be smaller than the number of the plurality of lenses 22 shown in FIG. 3. For example, the number of the plurality of lenses 22c may be smaller than the total number of luminance measurement points IP1 to IPn, and an interval between the plurality of lenses 22c may be greater than an interval between the luminance measurement points IP1 to IPn. For example, when the number of the plurality of lenses 22c shown in FIG. 9 is about ⅓ of the number of the plurality of lenses 22 shown in FIG. 3, the interval between the plurality of lenses 22c may be about three times the interval between the luminance measurement points IP1 to IPn.

The first rail 24c may be configured such that the base substrate 21c slides. For example, a long side of the first rail 24c may extend in the first direction DR1 and be curved with a first curvature.

A method for measuring multi-view luminance may be performed by using the multi-view luminance measuring device 20c as follows. First, when the plurality of lenses 22c are positioned at first luminance measurement points IPn, IP(n-3), IP(n-6), IP(n-9), IP(n-12), and IP(n-15), first luminances of the target point CP may be measured by using the plurality of optical sensors 23c (refer to FIG. 9).

Next, as the base substrate 21c moves along the first rail 24c, the plurality of lenses 22c may be positioned at second luminance measurement points IP(n-1), IP(n-4), IP(n-7), IP(n-10), IP(n-13), and IP(n-16) different from the first luminance measurement points IPn, IP(n-3), IP(n-6), IP(n-9), IP(n-12), and IP(n-15), and second luminances of the target point CP may be measured by using the plurality of optical sensors 23c (refer to FIG. 10).

Thereafter, if there are remaining luminance measurement points, after the base substrate 21c moves along the first rail 24c, a step of additionally measuring luminance by using the plurality of optical sensors 23c may be repeated. For example, as the base substrate 21c moves along the first rail 24c, the plurality of lenses 22c may be positioned at third luminance measurement points IP(n-2), IP(n-5), IP(n-8), IP(n-11), and IP(n-14), and third luminances of the target point CP may be measured by using the plurality of optical sensors 23c (refer to FIG. 11).

Next, a luminance profile for the target point CP may be generated by using the first luminances and the second luminances. In this case, if there are additionally measured luminances (for example, the third luminances of FIG. 11), corresponding luminances may also be used to generate the luminance profile.

In addition, in an embodiment of the present invention, the base substrate 21c and the first rail 24c may have flexibility so that the first curvature can be reset or changed. Therefore, even if only one multi-view luminance measuring device is provided, configuration cost can be reduced because it can be used to evaluate luminance of various display devices 10.

Figure 12:
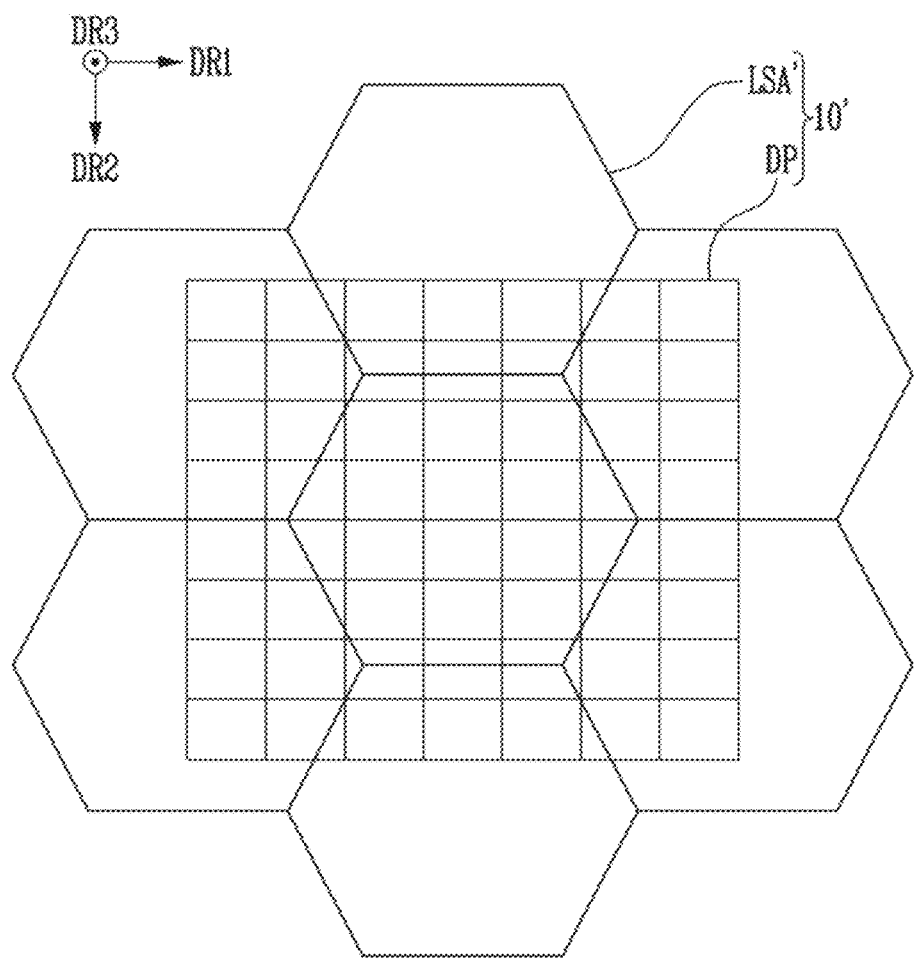
FIG. 12 is a diagram illustrating a case in which a lens array of a display device is arranged in two dimensions.

FIG. 12 is a diagram illustrating a case in which a lens array of a display device is arranged in two dimensions.

Referring to FIG. 12, a display device 10' according to an embodiment of the present invention may include a display panel DP and a lens array LSA'. In this case, the configuration of the display panel DP may be the same as that of the display panel DP described with reference to FIGS. 1 and 2.

However, compared to the lens array LSA of FIG. 2 arranged in the first direction DR1 that is one-dimensional, the lens array LSA' of FIG. 12 may be arranged in a first direction DR1 and a second direction DR2 that are two-dimensional. When viewing an image by using the display device 10 of FIG. 2, the user could view a multi-view image in the first direction DR1. However, when viewing an image using the display device 10' of FIG. 12, there is a difference in that the user can view a multi-view image not only in the first direction DR1 but also in the second direction DR2.

The lens array LSA' may be configured in various shapes. According to the embodiment shown in FIG. 12, lower surfaces of each of the lenses of the lens array LSA' that are contacting the sub-pixels of the display panel DP may be formed in, for example, a hexagonal shape and may be engaged with each other. However, the lower surfaces of each of the lenses of the lens array LSA' may be formed in a shape other than the hexagonal shape. In addition, an upper surface of the lens array LSA' may be composed of a circular convex lens. In addition to this, other conventionally known two-dimensional lens arrays may also be used.

Figure 13:
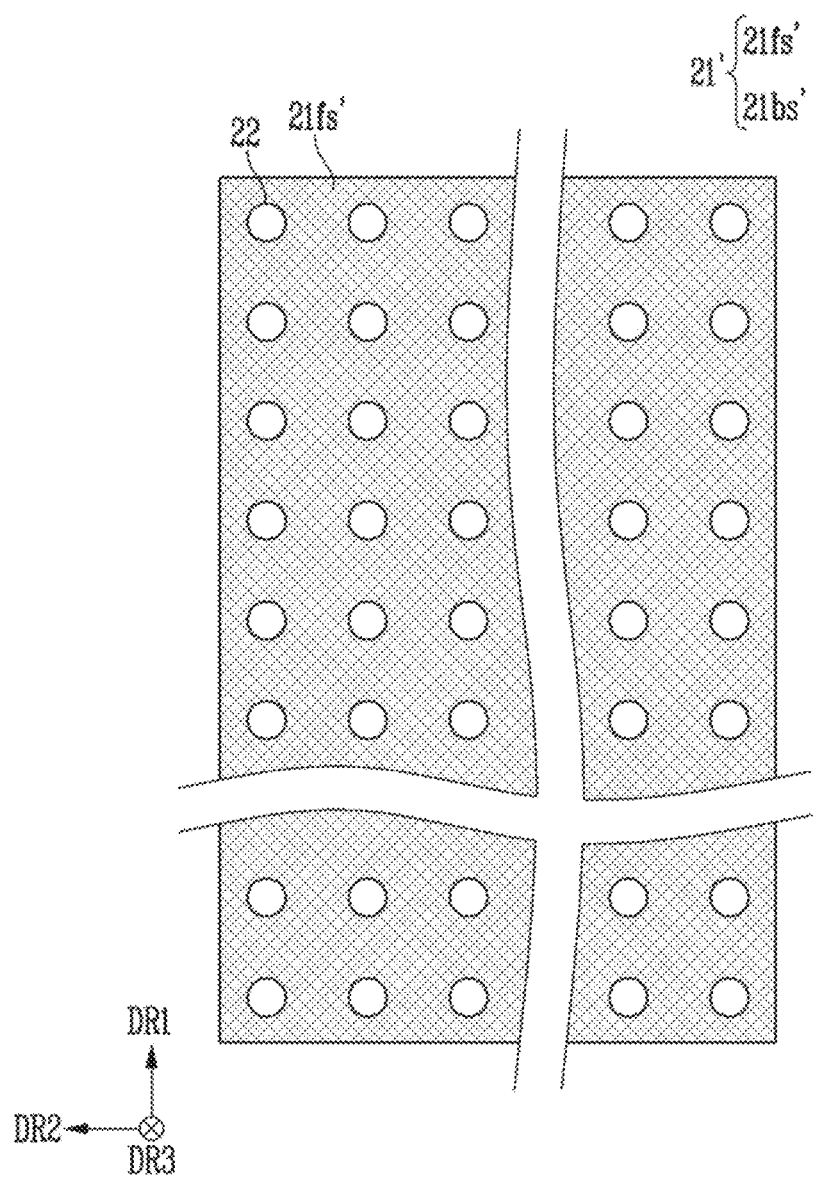
FIGS. 13 and 14 are diagrams illustrating a base substrate according to an embodiment of the present invention with respect to the display device of FIG. 12.
Figure 14:
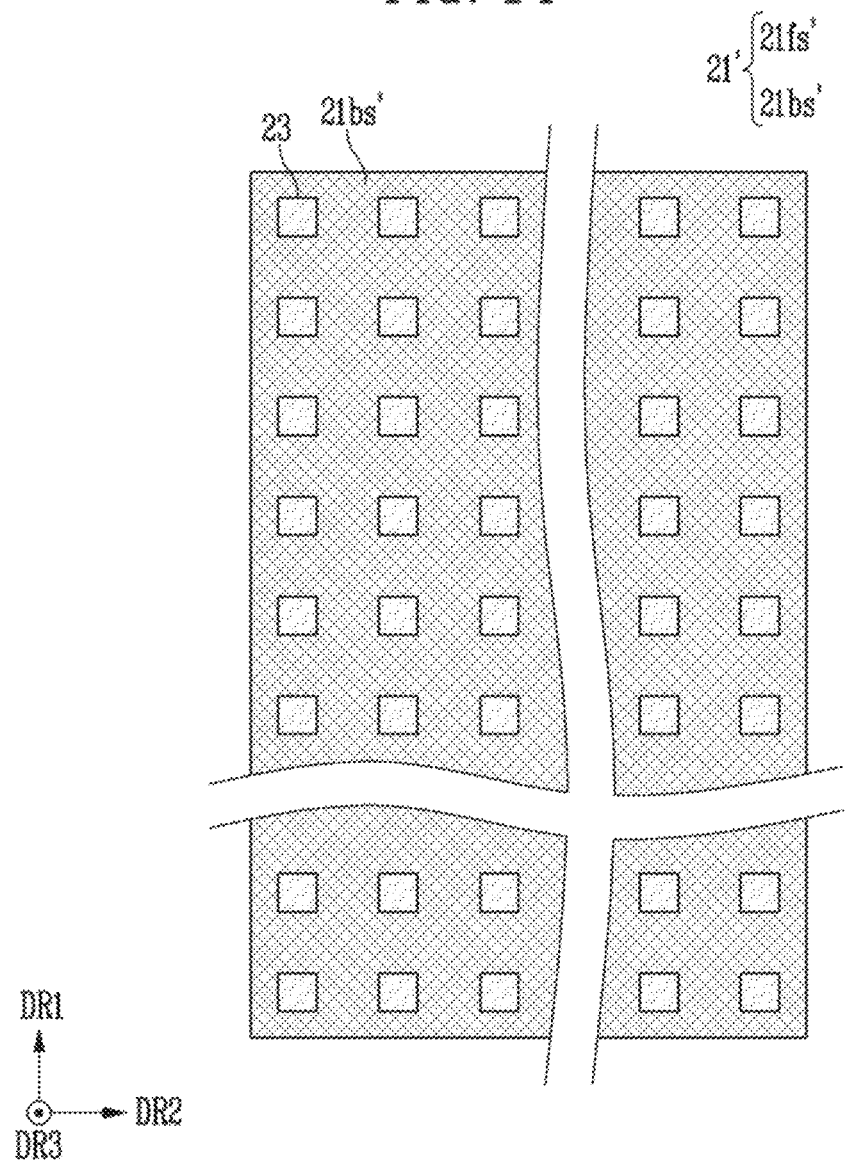

FIGS. 13 and 14 are diagrams illustrating a base substrate according to an embodiment of the present invention with respect to the display device of FIG. 12.

When referring to the inner surface 21fs and the outer surface 21bs of the base substrate 21 of FIGS. 4 and 5, an inner surface 21fs' and an outer surface 21bs' of the base substrate 21' of FIGS. 13 and 14 are different in that they further extend in the second direction DR2 when compared to the inner surface 21fs and the outer surface 21bs of the base substrate 21 of FIGS. 4 and 5. For example, the base substrate 21' may be wider than the base substrate 21 of FIGS. 4 and 5. Accordingly, since the luminance measurement points are widely distributed not only in the first direction DR1 but also in the second direction DR2, luminance measuring time for evaluating crosstalk of the display device 10' of FIG. 12 can be shortened.

Figure 15:
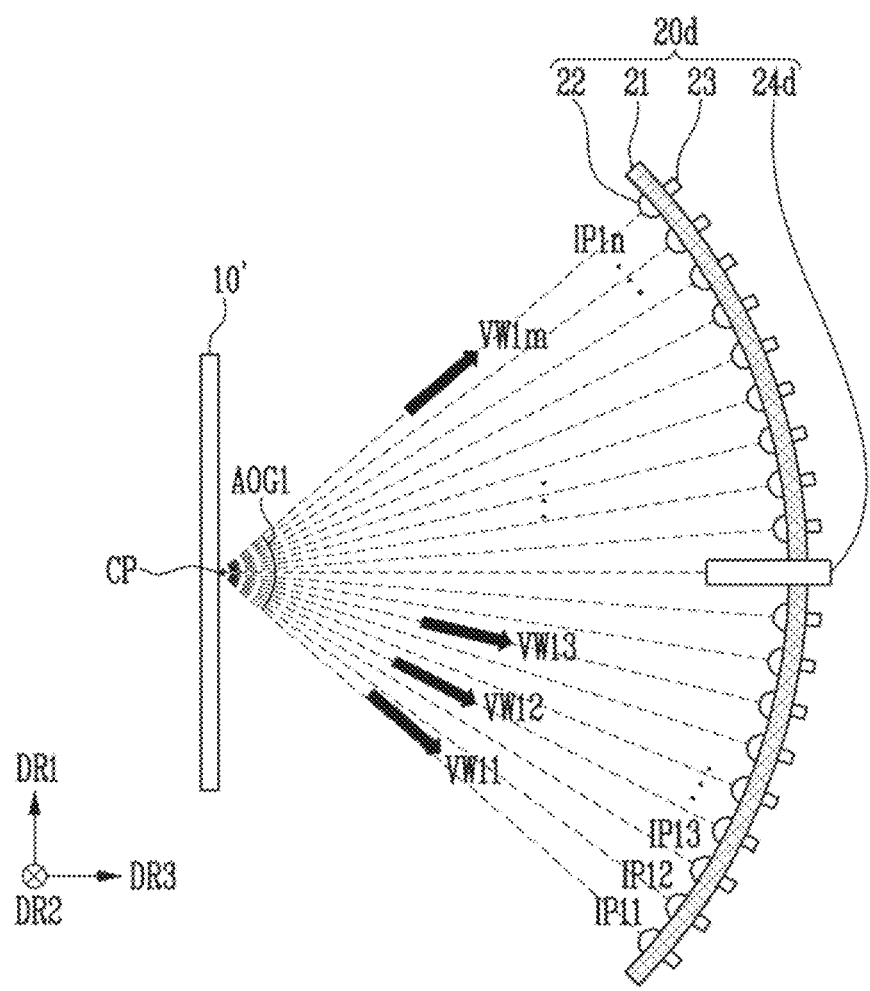

FIGS. 15 and 16 are diagrams illustrating a multi-view luminance measuring device according to an embodiment of the present invention with respect to the display device of FIG. 12.

A multi-view luminance measuring device 20d according to the present embodiment may further include a second rail 24d compared to the configuration of the multi-view luminance measuring device 20 of FIG. 3. Therefore, descriptions of components overlapping those of the multi-view luminance measuring device (FIG. 20) may be omitted or briefly discussed.

Referring to FIG. 15, a display device 10' may have a first viewing angle AOG1 with respect to a first direction DR1 based on a target point CP. The display device 10' may include a plurality of first viewpoints VW11, VW12, VW13, . . . , and VW1m with respect to a first direction DR1. The first viewing angle AOG1 may be an angle between a first first viewpoint VW11 and a last first viewpoint VW1m. Luminance measurement points IP11, IP12, IP13, . . . , and IP1n for the first viewing angle AOG1 may be predetermined.

For example, the second rail 24d may extend in a direction DR3 that intersects the direction in which the base substrate 21 extends. For example, the base substrate 21 may be attached to the second rail 24d and may slide along the second rail 24d.

Referring to FIG. 16, the display device 10' may have a second viewing angle AOG2 with respect to a second direction DR2 based on the target point CP. The display device 10' may include a plurality of second viewpoints VW21, VW22, VW23, . . . , and VW2p with respect to the second direction DR2, where p may be a natural number different from m. The second viewing angle AOG2 may be an angle between a first second viewpoint VW21 and a last second viewpoint VW2p. Luminance measurement points IP21, IP22, IP23, . . . , and IP2q for the second viewing angle AOG2 may be predetermined, where q may be a natural number different from n.

The second rail 24d may be configured such that the base substrate 21 slides. For example, the second rail 24d may extend in a second direction DR2 and be curved with a second curvature. A length of a long side of the second rail 24d may be set to cover the second viewing angle AOG2 based on the target point CP. For example, the length of a long side of the second rail 24d may be set to cover the entirety of the second viewing angle AOG2 based on the target point CP. However, when the length of the base substrate 21 in the second direction DR2 is sufficiently long, the length of the long side of the second rail 24d may be shorter.

According to the present embodiment, since luminance measurement may be performed multiple times while the base substrate 21 moves along the second rail 24d, it is possible to measure luminance of the display device 10' in the second direction DR2.

Further, in an embodiment of the present invention, by adding the second rail 24d to the multi-view luminance measuring device 20a1, 20b, or 20c of FIGS. 6 to 9, it is possible to measure the luminance of the display device 10' of FIG. 12 in the second direction DR2.

According to the multi-view luminance measuring device and the method for measuring multi-view luminance according to some embodiments of the present invention, luminance for a plurality of viewpoints can be measured in a short time with respect to a stereoscopic image display device.

While the present invention has been particularly shown and described with reference to embodiments thereof, it will be apparent those of ordinary skill in the art that various changes in form and detail may be made thereto without departing from spirit and scope of the present invention.

What is claimed is:

1. A multi-view luminance measuring device comprising:
a base substrate having a long side extending in a first direction and a short side extending in a second direction, wherein the long side is curved with a first curvature;
a plurality of lenses positioned on an inner surface of the base substrate; and
a plurality of optical sensors positioned on the base substrate to respectively correspond to the plurality of lenses,
wherein the first curvature is set such that a distance between each of the plurality of lenses and a target point is constant,
wherein a length of the long side of the base substrate is set to cover a viewing angle with reference to the target point,
wherein a plurality of openings in the base substrate expose the plurality of optical sensors, and
wherein a lowermost surface of each of the plurality of lenses is disposed in a corresponding opening of the plurality of openings.

2. The multi-view luminance measuring device of claim 1, wherein the plurality of lenses are convex lenses, and
wherein the plurality of lenses are integrally connected to each other.

3. The multi-view luminance measuring device of claim 1, wherein the plurality of optical sensors are mounted on a flexible circuit board,
wherein the flexible circuit board is in contact with an outer surface of the base substrate, and
wherein the plurality of optical sensors are disposed in the plurality of openings of the base substrate.

4. The multi-view luminance measuring device of claim 3, wherein the flexible circuit board is configured to be attachable to and detachable from the base substrate.

5. The multi-view luminance measuring device of claim 1, wherein the base substrate is flexible to allow changing the first curvature.

6. The multi-view luminance measuring device of claim 1, wherein a number of luminance measurement points are predetermined to generate a luminance profile, and
wherein a number of the plurality of lenses is equal to the number of the luminance measurement points.

7. The multi-view luminance measuring device of claim 1, wherein a number of the plurality of lenses is equal to a number of the plurality of optical sensors.

8. A multi-view luminance measuring device comprising:
a base substrate having a first side extending in a first direction and a second side extending in a second direction, wherein the first side is curved with a first curvature;
a plurality of lenses positioned on a first surface of the base substrate;
a plurality of optical sensors positioned on the base substrate to respectively correspond to the plurality of lenses, wherein a plurality of openings in the base substrate expose the plurality of optical sensors, wherein a lowermost surface of each of the plurality of lenses is disposed in a corresponding opening of the plurality of openings; and
a rail on which the base substrate slides,
wherein the first curvature is set such that a distance between each of the plurality of lenses and a target point is constant.

9. The multi-view luminance measuring device of claim 8, wherein a first side of the rail extends in the first direction and is curved with the first curvature.

10. The multi-view luminance measuring device of claim 8, wherein a number of the plurality of lenses is equal to a number of the plurality of optical sensors.

11. The multi-view luminance measuring device of claim 8, wherein a length of the first side of the base substrate is set to cover a part of a viewing angle with reference to the target point.

12. The multi-view luminance measuring device of claim 8, wherein a number of luminance measurement points are set in advance to generate a luminance profile,
wherein a number of the plurality of lenses is smaller than the number of the luminance measurement points, and
wherein an interval between the plurality of lenses is a same as an interval between the luminance measurement points.

13. The multi-view luminance measuring device of claim 8, wherein a number of luminance measurement points are set in advance to generate a luminance profile,
wherein a number of the plurality of lenses is smaller than the number of the luminance measurement points, and
wherein an interval between the plurality of lenses is greater than an interval between the luminance measurement points.

14. The multi-view luminance measuring device of claim 8, wherein the plurality of lenses are convex lenses, and
wherein the plurality of lenses are integrally connected to each other.

15. The multi-view luminance measuring device of claim 8, wherein the plurality of optical sensors are mounted on a flexible circuit board,
wherein the flexible circuit board is disposed on a second surface of the base substrate, and
wherein the plurality of optical sensors are disposed in the plurality of openings of the base substrate.

16. The multi-view luminance measuring device of claim 15, wherein the flexible circuit board is configured to be attachable to and detachable from the base substrate.

17. The multi-view luminance measuring device of claim 8, wherein each of the base substrate and the rail is flexible to allow changing the first curvature.

18. A method for measuring multi-view luminance using a multi-view luminance measuring device,
wherein the multi-view luminance measuring device includes:
a base substrate having a curved side;
a plurality of lenses positioned on a first surface of the base substrate;
a plurality of optical sensors positioned on the base substrate and respectively corresponding to the plurality of lenses, wherein a plurality of openings in the base substrate expose the plurality of optical sensors, wherein a lowermost surface of each of the plurality of lenses is disposed in a corresponding opening of the plurality of openings; and
a rail on which the base substrate slides, and
wherein the method for measuring multi-view luminance comprises:
measuring first luminances of a target point by using the plurality of optical sensors when the plurality of lenses are positioned at first luminance measurement points;
measuring second luminances of the target point by using the plurality of optical sensors in a state in which the plurality of lenses are positioned at second luminance measurement points that are different from the first luminance measurement points as the base substrate moves along the rail; and
generating a luminance profile for the target point by using the first luminances and the second luminances.

19. The method of claim 18, wherein an interval between the plurality of lenses is a same as an interval between the first luminance measurement points.

20. The method of claim 18, wherein an interval between the plurality of lenses is greater than an interval between the first luminance measurement points.

* * * * *